United States Patent
Koumura et al.

(10) Patent No.: US 6,542,680 B2
(45) Date of Patent: Apr. 1, 2003

(54) OPTICAL FIBER PREFORM

(75) Inventors: Yukio Koumura, Tokyo (JP);
Masahide Kuwabara, Tokyo (JP);
Kazuto Hirabayashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/949,732

(22) Filed: Sep. 12, 2001

(65) Prior Publication Data

US 2002/0057879 A1 May 16, 2002

(51) Int. Cl.$^7$ .................................................. G02B 6/02
(52) U.S. Cl. ........................... 385/123; 65/157; 65/412; 385/147
(58) Field of Search ................................ 385/123, 124, 385/125, 126, 141, 147; 65/423, 157, 398, 412, 900, 415, 144, 397, 426

(56) References Cited

U.S. PATENT DOCUMENTS

| | | | |
|---|---|---|---|
| 4,345,928 A | * | 8/1982 | Kawachi et al. ............... 65/412 |
| 4,406,684 A | * | 9/1983 | Kawachi et al. ............... 65/144 |
| 4,822,399 A | * | 4/1989 | Kanamori et al. ............. 65/398 |
| 4,969,941 A | * | 11/1990 | Kyoto et al. .................. 65/157 |
| 5,259,856 A | * | 11/1993 | Ohga et al. .................... 65/423 |

* cited by examiner

*Primary Examiner*—Akm E. Ullah
(74) *Attorney, Agent, or Firm*—Oblon, Spivak, McClelland, Maier & Neustadt, P.C.

(57) ABSTRACT

An optical fiber preform is a material used for fabricating optical fibers. The optical fiber preform has a target rod which will be the core for optical fibers and a glass layer formed around the outside thereof. A mass W (kg) of the optical fiber preform and a diameter D (cm) of the target rod satisfy a relational expression $0.4 \cdot (W)^{1/2} < D$. Satisfying this relational expression can prevent the optical fiber preform from being deformed and to have uneven diameters due to the weight thereof in the dehydrating and consolidating process in fabricating the optical fiber preform, even though it is a large-sized optical fiber preform having a diameter of 10 cm or more.

3 Claims, 3 Drawing Sheets

OPTICAL FIBER PREFORM

BACKGROUND OF THE INVENTION

Traditionally, an optical fiber preform has been manufactured by utilizing techniques of VAD (Vertical Axis Deposition), OVD (Outer Vapor Deposition) or MCVD (Modified CVD). The optical fiber preform is fiber-drawn to manufacture optical fibers. Recently, in order to enhance the production of optical fibers and to reduce manufacturing costs there were some tries to upsize the preform. It was upsized to increase the length of optical fibers to be manufactured out of the optical fiber preform.

SUMMARY

In one aspect, the invention is to provide the following optical fiber preform. That is, the optical fiber preform comprises of:

a target rod which will be the core of the optical fiber, and a glass layer formed around the circumference of the target rod, wherein the optical fiber preform is formed to be an optical fiber preform having an outer diameter of 10 cm or more, and a mass of the optical fiber preform and a diameter of the target rod will satisfy a relational expression, $0.4 \cdot (W)^{1/2} < D$, where the mass of the optical fiber preform is set as W (kg) and the diameter of the target rod is set as D (cm).

BRIEF DESCRIPTION OF THE DRAWINGS

An exemplary embodiment of the invention will now be described in conjunction with drawings in which.

DETAILED DESCRIPTION

Figure 1A:
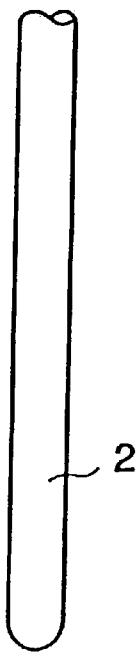
FIG. 1A depicts of a target rod.

When an optical fiber preform is fabricated, for example, at least a rod-like member which will be made into a core of an optical fiber, is first produced. An example of a technique used for producing this member is VAD. For example, the porous preform obtained in this VAD process is dehydrated to consolidate at a temperature of 1200 to 1600° C. Then, it is stretched, as further required, and a target rod (core rod) 2 as shown in FIG. 1A is produced.

Figure 1B:
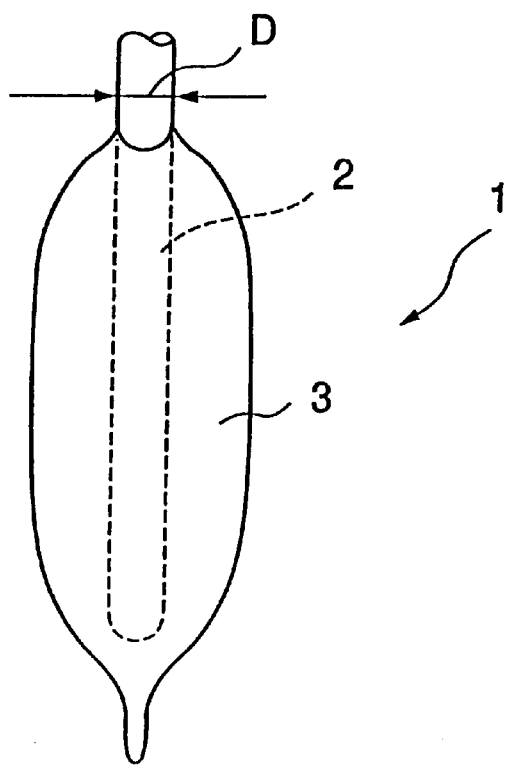
FIG. 1B depicts an illustration diagram schematically illustrating one example of the optical fiber perform that is one embodiment of the invention.

Subsequently, as shown in FIG. 1B, a glass layer 3 is formed around the circumference of the target rod 2. An example of a technique used for producing this glass layer 3 is OVD. The glass layer 3 will be used as a cladding of an optical fiber.

Thus, an optical fiber preform can be manufactured from the product that the glass layer 3 and the target 2 has formed during the process described above.

Traditionally, optical fibers could be manufactured in about a length of 200 to 300 km out of the optical fiber preform 1 produced.

Recently, in order to upsize the optical fiber preform, attempts has been made to increase the outer diameter of the preform, for example, 1 to 10 cm or more. If the optical fiber preform 1 is upsized, optical fibers having a proper cladding/core ratio can be fabricated, for example, with a length of 1000 km or more out of the optical fiber preform 1. Additionally, the ratio between the diameter of the target rod 2 and the thickness of the glass layer 3 of the optical fiber preform 1 will correspond the ratio between the core diameter and the cladding diameter (cladding/core ratio) of the optical fiber.

However, when the optical fiber preform 1 was upsized, the mass of the optical fiber preform 1 inevitably becomes heavy. On this account, the following problem occurred.

Figure 3:
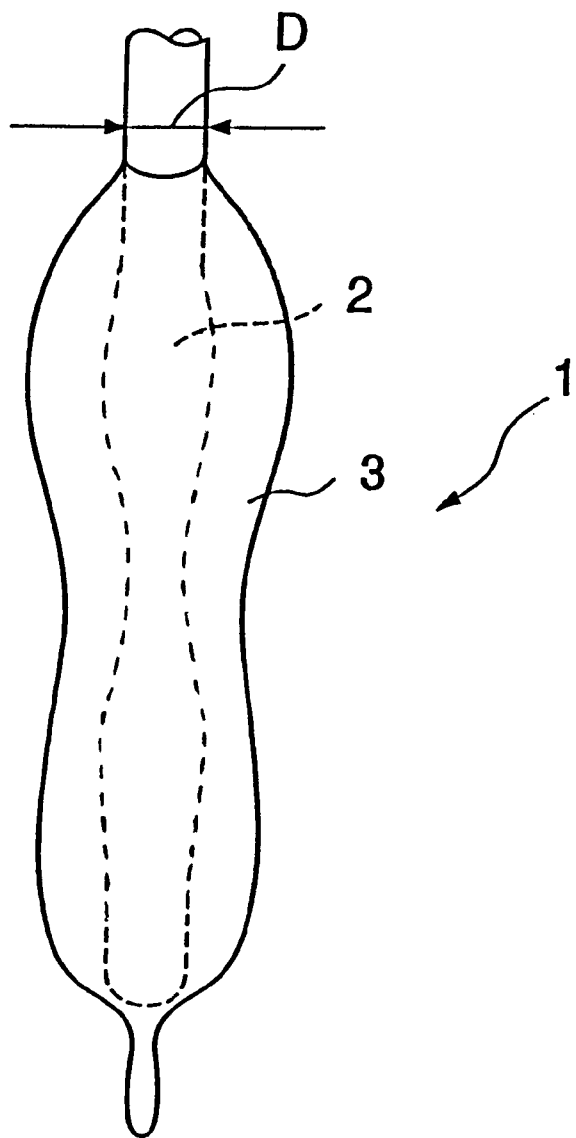
FIG. 3 depicts an illustration for describing an example of the optical fiber preform wherein outer diameters have been varied.

When the porous material in which the target rod 2 is formed with the glass layer 3, the optical fiber preform 1 has a diameter which is almost constant from one end to the other end. However, in the subsequent dehydrating and consolidating process, the optical fiber preform 1 was deformed as shown in FIG. 3, due to the weight and it has varied outer diameters. The outer diameter variation becomes noticeable as the optical fiber preform 1 is upsized.

Here, when a maximum outer diameter value is set as $\phi$ max and a minimum outer diameter value is set as $\phi$ min in the optical fiber preform 1, a value led by an equation, $(\phi \text{ max} - \phi \text{ min})/\phi \text{ max} \times 100\%$, is defined as an outer diameter regulation. When the outer diameter regulation exceeds 20%, the cladding/core ratio inside an optical fiber is varied. On this account, when the outer diameter regulation of the optical fiber preform 1 exceeds 20%, there is a possibility that optical fibers might not be fabricated within standards even though this optical fiber preform is fiber-drawn to produce optical fibers.

In order to meet the outer diameter regulation of the optical fiber preform 1, defining the temperature conditions for dehydration and consolidation process must be considered. Furthermore, it is also considered that the optical fiber preform 1 will be fiber drawn, after being dehydrated and consolidated and is stretched to obtain a constant diameter. However, a problem is that the outer diameter variation can be suppressed but the optical fiber preform 1 cannot be completely dehydrated and consolidated, therefore increasing manufacturing processes. On this account, a new problem occurs that the solution for such problem needs to be thought.

In one aspect, the invention is to provide an optical fiber preform capable of easily suppressing the outer diameter variation in the dehydrating and consolidating process.

Hereafter, an embodiment of the invention will be described in accordance with the drawings.

Figure 2:
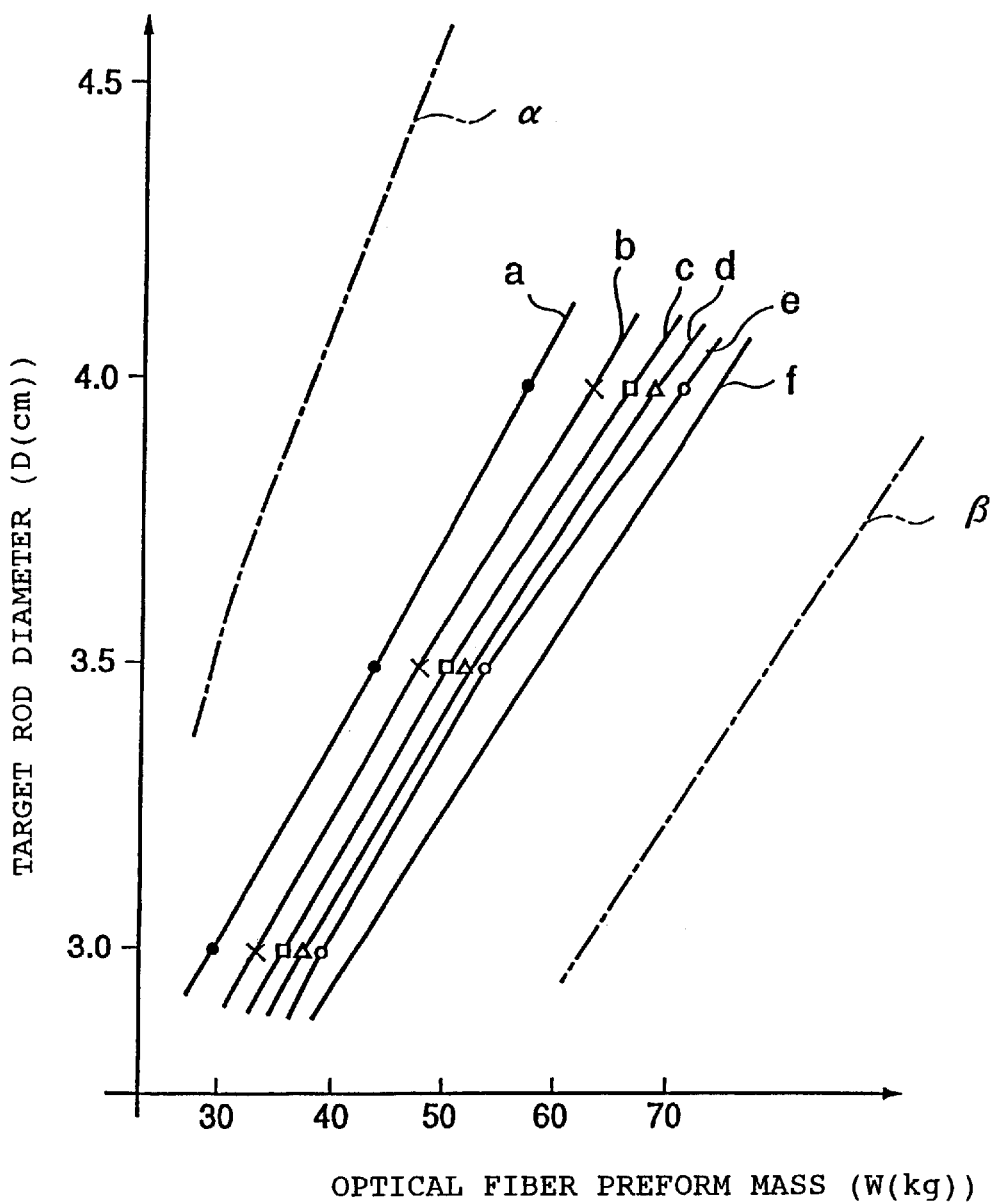
FIG. 2 depicts graphs showing exemplary relationships among a mass (W) of optical fiber preforms, a diameter (D) of target rods and an outer diameter regulation of optical fiber preforms.

The inventor tried various attempts for suppressing the outer diameter variation of the optical fiber preform 1 in the dehydrating and consolidating process in fabricating a large-sized optical fiber preform 1 having an outer diameter of 10 cm or more. Thereby, the inventor noticed that a relationship between a diameter D of the target rod 2 and a mass W of the optical fiber preform 1 is greatly involved in the outer diameter variation of the optical fiber preform 1. Then, the inventor found relationships as shown in FIG. 2. FIG. 2 shows that how the relationship between the diameter D of the target rod 2 and the mass W of the optical fiber preform 1 differs according to the differences in the outer diameter regulation of the optical fiber preform 1 (solid lines a to Additionally, the results shown in FIG. 2 was obtained by the inventor. The solid line a shown in FIG. 2 is the case where the outer diameter regulation of the optical fiber preform 1 is 4.0%. The solid line b is the case where the outer diameter regulation of the optical fiber preform 1 is 4.5%. The solid line c is the case where the outer diameter regulation of the optical fiber preform 1 is 5.0%. The solid line d is the case where the outer diameter regulation of the optical fiber preform 1 is 5.5%. The solid line e is the case where the outer diameter regulation of the optical fiber preform 1 is 6.0%. The solid line f is the case where the outer diameter regulation of the optical fiber preform 1 is 7.0%. A broken line α indicates a graph of a function $D=2 \cdot (W)^{1/2}/3$. A chain line β indicates a graph of a function $D=0.4 \cdot (W)^{1/2}$. Furthermore, a function $D=(w)^{1/2}/2$ is almost the same as the solid line c. In addition, there is an experimental result that the outer diameter regulation of the optical fiber preform 1 is 18. The result has a few data and thus it is not shown in FIG. 2. However, the line of 18. of the outer diameter regulation is within a range that satisfies $D>0.4 \cdot (W)^{1/2}$.

The relationships as shown in FIG. 2 reveals that if the diameter D (cm) of the target rod 2 and the mass W (kg) of the optical fiber preform 1 satisfy a relational expression, $0.4 \cdot (W)^{1/2}<D$, there will be no practical problem in suppressing the outer diameter variation of the optical fiber preform 1.

Accordingly, in one embodiment of the optical fiber preform as one embodiment of the invention, when the mass of the optical fiber preform 1 is set W (kg) and the diameter of the target rod 2 is set D (cm), the mass W (kg) of the optical fiber preform 1 and the diameter D (cm) of the target rod 2 satisfy the following relational expression (1):

$$0.4 \cdot (W)^{1/2} < D \qquad (1)$$

Additionally, the optical fiber preform 1 of the embodiment is a large-sized optical fiber preform that has an outer diameter of 10 cm or more and a mass of 30 kg or more and can form optical fibers having a proper cladding/core ratio in a length of 1000 km or longer.

According to this embodiment, the mass W (kg) of the optical fiber preform 1 and the diameter D (cm) of the target rod 2 satisfy the relational expression, $0.4 \cdot (W)^{1/2}<D$, and therefore the outer diameter variation of the optical fiber preform 1 in the dehydrating and consolidating process can be suppressed. This has been confirmed by an experiment done by the inventor, where the diameter D of the target rod 2 is fixed, the mass W of the optical fiber preform 1 is varied and the outer diameter regulation of the optical fiber preform 1 were measured at every mass W. The experimental results are shown in Tables 1 to 3 respectively.

Additionally, Table 1 shows the experimental results in the case where the diameter D of the target rod 2 is 3.0 cm. Table 2 shows the experimental results in the case where the diameter D of the target rod 2 is 3.5 cm. Table 3 shows the experimental results in the case where the diameter D of the target rod 2 is 4.0 cm. Furthermore, in this experiment, conditions other than the diameter D of the target rod 2 and the mass W of the optical fiber preform 1 were set the same.

TABLE 1

| Preform Mass (kg) | 30 | 35 | 40 | 45 | 55 |
|---|---|---|---|---|---|
| Outer Diameter Regulation (%) | 3.9 | 4.8 | 6.2 | 8.6 | 18 |

TABLE 2

| Preform Mass (kg) | 40 | 45 | 50 | 55 | 70 |
|---|---|---|---|---|---|
| Outer Diameter Regulation (%) | 3.6 | 4.2 | 5.3 | 6.8 | 16 |

TABLE 3

| Preform Mass (kg) | 55 | 60 | 65 | 70 |
|---|---|---|---|---|
| Outer Diameter Regulation (%) | 3.9 | 4.4 | 5.2 | 6.3 |

According to these experimental results, it was also confirmed that if the mass W (kg) of the optical fiber preform 1 and the diameter D (cm) of the target rod 2 satisfy the relational expression, $0.4 \cdot (W)^{1/2}<D$, the outer diameter regulation of the large-sized optical fiber preform 1 can be met, preferably 10% or less.

Previously, the relationship among the outer diameter regulation of the optical fiber preform 1, the diameter D (cm) of the target rod 2 and the mass W (kg) of the optical fiber preform 1 have hardly been considered. Therefore, it is a substantial breakthrough that the relational expression, $0.4 \cdot (W)^{1/2}<D$, for meeting the outer diameter regulation of the optical fiber preform 1 has been found.

Furthermore, in this embodiment, only defining the relationship between the diameter D of the target rod 2 and the mass W of the optical fiber preform 1 (that is, only defining an upper limit of the mass W of the whole optical fiber preform 1 with respect to the diameter D of the target rod 2) can suppress the outer diameter variation of the large-sized optical fiber preform 1 without changing the previous fabricating techniques.

Moreover, the previous manufacturing techniques do not need to be changed. Thus the optical fiber preform 1, meeting the outer diameter regulation, can be manufactured easily while the problem that the optical fiber preform 1 is not completely dehydrated and consolidated or a new problem such as an increase in the manufacturing processes is avoided.

It is to be understood that the invention is not limited to this embodiment, but can be applied to various cases. For example, although the target rod 2 was produced by VAD in this embodiment, the target rod 2 may be formed such way that a rod-like member is formed by VAD, the rod-like member is dehydrated and consolidated, the glass layer is then formed around the outside thereof by OVD, subjecting to dehydration and consolidation, and the obtained product is further stretched.

In addition, in this embodiment, the optical fiber preform 1 has the outer diameter of 10 cm or more and the mass of 30 kg or more, but the mass may be under 30 kg when the outer diameter is 10 cm or above.

Additionally, the following optical fiber preform 1 was fabricated as another embodiment. The optical fiber preform 1 is a large-sized optical fiber preform where a diameter D of the target rod 2 is 3.5 cm and a mass W is 50 kg. This optical fiber preform 1 has a maximum outer diameter value φ max of 14.5 cm, a minimum outer diameter value φmin of 11.6 cm, an outer diameter regulation of 20., and a slightly narrower center part thereof. The reason why it was formed to have such a shape is thought that the temperature of the center part itself rose and the weight on the under side caused the center part to extend and to be narrower than the other portions because heating time was prolonged in the dehydrating and consolidating process. Also in this optical fiber preform 1, the relational expression $0.4 \cdot (W)^{1/2}<D$ is satisfied and it was confirmed that an optical fiber having a proper cladding/core ratio can be fabricated.

Furthermore, a large-sized optical fiber preform 1 where a diameter D of the target rod 2 is 3.5 cm, a mass W is 50 kg, a maximum outer diameter value $\phi max$ is 14.5 cm, a minimum outer diameter value $\phi min$ is 11.9 cm and an outer diameter regulation is 18. was fabricated. Also in this case, the relational expression $0.4 \cdot (W)^{1/2} < D$ is satisfied and it was confirmed that an optical fiber having a proper cladding/core ratio can be fabricated, as similar to that described above.

What is claimed is:

1. An optical fiber preform comprising:

a target rod which will be the core; and a glass layer formed around a circumference of the target rod wherein the optical fiber preform is formed to be a large-sized optical fiber preform having an outer diameter of 10 cm or more, and a mass of the optical fiber preform and a diameter of said target rod satisfy a relational expression, $0.4 \cdot (W)^{1/2} < D$, where the mass of the optical fiber preform is defined as W (kg) and the diameter of the target rod is defined as D (cm).

2. The optical fiber preform according to claim 1, wherein the mass of the optical fiber preform is 30 kg or more.

3. An optical fiber, characterized in that;

an optical fiber preform that includes a target rod which will be the core; and a glass layer formed around a circumference of the target rod, wherein the optical fiber perform is formed to be a large-sized optical fiber preform having an outer diameter of 10 cm or more, and a mass of the optical fiber preform and a diameter of said target rod satisfy a retational expression, $0.4 \times (W)^{1/2} < D$, where the mass of the optical fiber preform is defined as W (kg) and the diameter of the target rod is defined as D (cm).

* * * * *

UNITED STATES PATENT AND TRADEMARK OFFICE
CERTIFICATE OF CORRECTION

PATENT NO. : 6,542,680 B2
DATED : April 1, 2003
INVENTOR(S) : Koumura et al.

It is certified that error appears in the above-identified patent and that said Letters Patent is hereby corrected as shown below:

<u>Title page,</u>
Insert Item [30], Foreign Application Priority Data, as follows:

-- [30]        Foreign Application Priority Data

Sept. 12, 2000      (JP)............................2000-276150
  Jul. 17, 2001       (JP)...........................2001-216906 --

Signed and Sealed this

Twelfth Day of August, 2003

JAMES E. ROGAN
*Director of the United States Patent and Trademark Office*